United States Patent [19]
Orban et al.

[11] Patent Number: 5,668,475
[45] Date of Patent: Sep. 16, 1997

[54] INDUCTION LOGGING SONDE INCLUDING A FOLDED ARRAY APPARATUS HAVING A PLURALITY OF RECEIVER COWOUND COILS AND BUCKING COILS

[75] Inventors: Andre E. Orban, Sugar Land; Timothy Leslie Long, Alvin, both of Tex.

[73] Assignee: Schlumberger Technology Corporation, Houston, Tex.

[21] Appl. No.: 566,336

[22] Filed: Dec. 1, 1995

[51] Int. Cl.$^6$ ................................................. G01V 3/28
[52] U.S. Cl. ................................................. 324/339
[58] Field of Search ................................. 324/338, 339, 324/340, 341

[56] References Cited

U.S. PATENT DOCUMENTS

| | | | |
|---|---|---|---|
| 3,327,203 | 6/1967 | Attali | 324/339 |
| 5,041,975 | 8/1991 | Minerbo et al. | 364/422 |
| 5,157,605 | 10/1992 | Chandler | 364/422 |
| 5,184,079 | 2/1993 | Barber | 324/339 |
| 5,355,088 | 10/1994 | Howard, Jr. | 324/339 |
| 5,379,216 | 1/1995 | Head | 364/422 |

FOREIGN PATENT DOCUMENTS 207853  2/1968  U.S.S.R. .................. 324/339

OTHER PUBLICATIONS

SPE 30583 "A Multiarray Induction Tool Optimized for Efficient Wellsite Operation", Oct. 22–25, 1995, A.Orban, T.Long, T.Barber, G.Hazen, R.Schlein, S.Alderman, J.Tabanou, J.Seydoux.

Primary Examiner—Gerard R. Strecker
Attorney, Agent, or Firm—John H. Bouchard; John J. Ryberg

[57] ABSTRACT

A new induction logging tool has a toolstring length that is shorter than the toolstring length of the induction logging tool of the prior art. The new induction logging tool includes a new induction array which appears to be folded about an axis that coincides with the transmitter of the induction array of the prior art induction logging tool. The new folded induction array including a transmitter coil, located at an end of the new folded induction array, and a plurality of "cowound" receiver coils and bucking coils, a further plurality of individual receiver coils, and at least one further bucking coil located adjacent to and on one side of the transmitter coil of the new folded induction array. In the new folded induction array, each of the plurality of cowound receiver coils and bucking coils include a receiver coil (N–1) and a bucking coil (N), associated with another receiver coil (N), which are cowound together about the same bobbin, the receiver coil (N–1) and the bucking coil (N) being positioned at approximately the same distance from the transmitter coil. Each of the plurality of cowound receiver coils and bucking coils are formed by winding both the bucking coil (N) and the receiver coil (N–1) in a bifilar way on the same ceramic bobbin starting from the center of the bobbin and winding the receiver coil (N–1) and the bucking coil (N) in opposite outward directions.

14 Claims, 4 Drawing Sheets

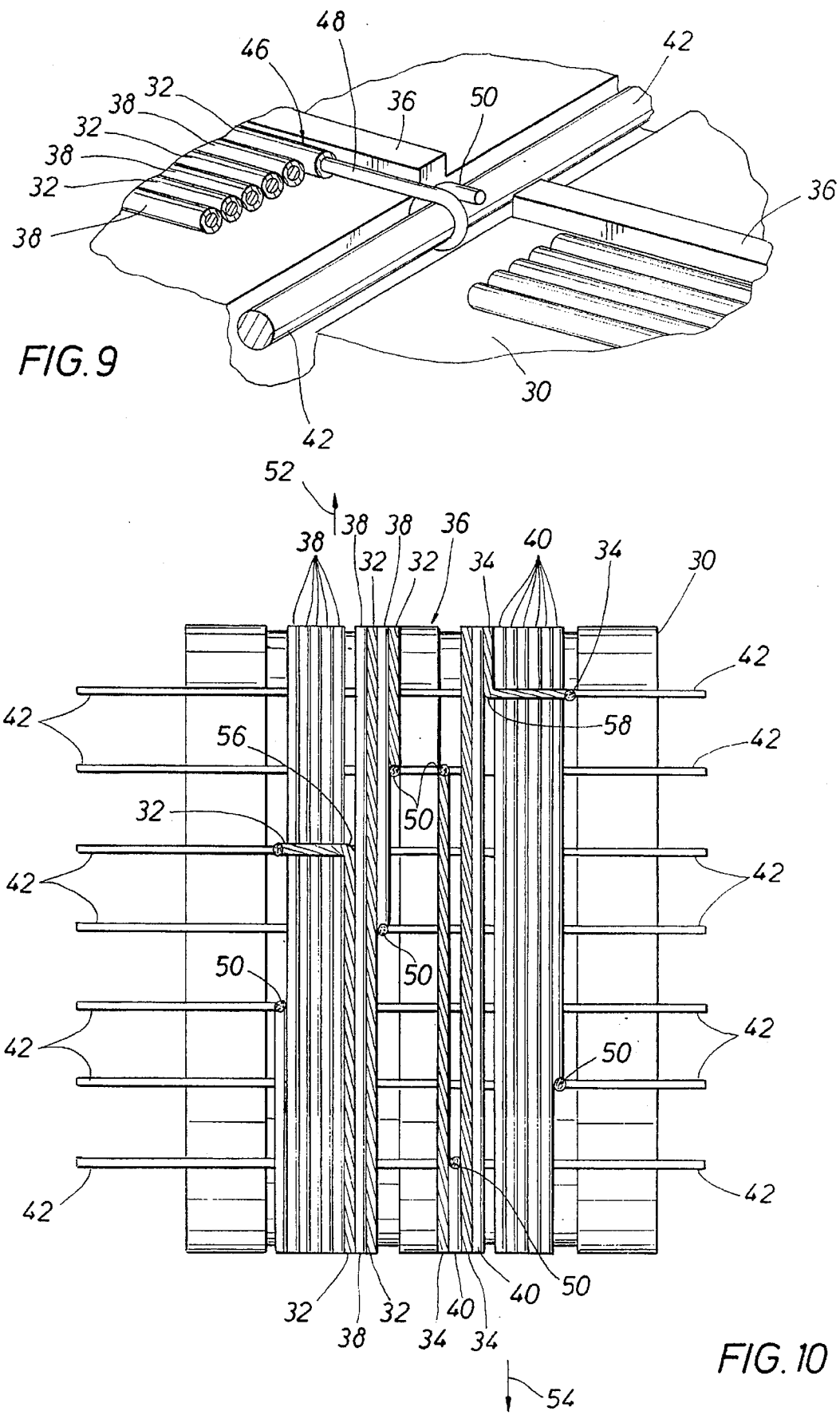

INDUCTION LOGGING SONDE INCLUDING A FOLDED ARRAY APPARATUS HAVING A PLURALITY OF RECEIVER COWOUND COILS AND BUCKING COILS

BACKGROUND OF THE INVENTION

The subject matter of the present invention relates to an induction logging sonde adapted to be disposed in a wellbore including a "folded" sensor array, the sensor array including a transmitter coil and a plurality of bucking coils and receiver coils, the plurality of bucking coils and receiver coils further including a plurality of cowound bucking coils and receiver coils, each of the plurality of cowound bucking coils and receiver coils being cowound together on the same bobbin, the transmitter coil being located at an end of the array, the plurality of bucking coils and receiver coils including the plurality of cowound bucking coils and receiver coils being located only on one side of the transmitter coil thereby shortening the sensor array of the present invention relative to the prior art sensor array of other prior art induction logging tools.

Over the past two decades, the electronics industry has been packing more and more circuitry into smaller and smaller packages. However, in the past decade and half, since digital well logging tools were introduced, the tendency has been to pack more circuitry into the logging tools. Examples of such circuitry packed into the logging tools include self-test, automatic calibration, more measurement channels, more sensors, etc. As a result, a conventional well logging toolstring combination of today is longer, in length, than its counterpart toolstring of fifteen years ago. The measurements, made by the conventional well logging toolstring, are more accurate and plentiful, and the environmental corrections are more automatic, but the increased toolstring length, of the conventional well logging tool, means that more rathole must be drilled and the rig-up time (the time it takes to assemble the toolstring) takes much longer.

One example of a conventional well logging induction tool is disclosed in U.S. Pat. No. 5,157,605 to Chandler et al, entitled "Induction Logging Method and Apparatus Including Means for Combining In-Phase and Quadrature Components of Signals Received at Varying Frequencies and Including use of Multiple Receiver Means Associated With a Single Transmitter", the disclosure of which is incorporated by reference into this specification.

In the Chandler patent, the induction tool includes an induction array, and the induction array includes a transmitter coil, a receiver coil disposed on both sides of the transmitter coil, and a secondary or bucking coil disposed on both sides of the transmitter coil and interposed between the transmitter coil and each receiver coil. While the measurements made by the induction logging tool of the Chandler patent are accurate and plentiful, the length of the induction logging tool string which included the induction array of the Chandler patent is approximately forty (40) feet. As a result, it may be difficult to place the induction logging toolstring of the Chandler patent in wellbores having a minimum rathole, or in wellbores having severe dog legs, or in horizontal wellbores having a short kickoff radius.

As a result, there is a need for a new induction logging tool, in accordance with the present invention, which has a toolstring length (16 feet) that is shorter than the toolstring length (40 feet) of the induction logging tool of the prior art Chandler patent. As a result, the new induction logging tool of the present invention is less prone to getting stuck in wellbores having poor borehole conditions, and it will provide logs in minimum rathole, it may be placed into wellbores having severe dog legs, and it may be placed into horizontal wellbores having a short kickoff radius.

SUMMARY OF THE INVENTION

Accordingly, it is a primary object of the present invention to provide a new induction logging tool which has a toolstring length that is shorter than the toolstring length of the induction logging tool of the prior art.

It is a further object of the present invention to provide a new induction logging tool which has a toolstring length that is shorter than the toolstring length of the induction logging tool of the prior art, the new induction logging tool including a new induction array which appears to be folded about an axis relative to the induction array of the prior art induction logging tool, and, as a result of the apparent folding about the axis, the new induction logging tool is shorter in length than the prior art induction logging tools.

It is a further object of the present invention to provide a new induction logging tool which has a toolstring length that is shorter than the toolstring length of the induction logging tool of the prior art, the new induction logging tool including a new induction array which appears to be folded about an axis relative to the induction array of the prior art induction logging tool, the new folded induction array including a transmitter coil and a plurality of receiver coils and bucking coils which further include a plurality of cowound receiver coils and bucking coils, the transmitter coil being located at an end of the new folded induction array and the plurality of receiver coils and bucking coils including the plurality of cowound receiver coils and bucking coils being located adjacent to and only on one side of the transmitter coil of the new folded induction array, the length of the new folded induction array being approximately half the length of the induction array of the prior art induction tool in view of the cowinding of the receiver coils and bucking coils.

It is a further object of the present invention to provide a new induction logging tool which has a toolstring length that is shorter than the toolstring length of the induction logging tool of the prior art, the new induction logging tool including a new induction array which appears to be folded about an axis relative to the induction array of the prior art induction logging tool, the new folded induction array including a transmitter coil and a plurality of cowound receiver coils and bucking coils, the transmitter coil being located at an end of the new folded induction array and the plurality of cowound receiver coils and bucking coils being located adjacent to and on one side of the transmitter coil of the new folded induction array, the length of the new folded induction array being approximately half the length of the induction array of the prior art induction tool, each of the plurality of cowound receiver coils and bucking coils including a receiver coil (N−1) and a bucking coil (N) associated with another receiver coil (N), the receiver coil (N−1) being positioned at the same distance from the transmitter coil as the bucking coil (N) associated with said another receiver coil (N).

It is a further object of the present invention to provide a new induction logging tool which has a toolstring length that is shorter than the toolstring length of the induction logging tool of the prior art, the new induction logging tool including a new induction array which appears to be folded about an axis which coincides with the transmitter of the prior art induction array of the prior art induction logging tool, the new folded induction array including a transmitter coil and a plurality of cowound receiver coils and bucking coils, the transmitter coil being located at an end of the new folded induction array and the plurality of cowound receiver coils and bucking coils being located adjacent to and on one side of the transmitter coil of the new folded induction array, the length of the new folded induction array being approximately half the length of the induction array of the prior art induction tool, each of the plurality of cowound receiver coils and bucking coils including a receiver coil (N−1) and a bucking coil (N), associated with another receiver coil (N), which are wound together on the same ceramic bobbin, the receiver coil (N−1) being positioned at approximately the same distance from the transmitter coil as the bucking coil (N), each of the plurality of cowound receiver coils and bucking coils being formed by winding both the bucking coil (N) and the receiver coil (N−1) in a bifilar way on the same ceramic bobbin starting from the center of the bobbin and winding the receiver coil (N−1) and the bucking coil (N) in opposite outward directions.

In accordance with these and other objects of the present invention, a new induction logging tool has a toolstring length that is shorter than the toolstring length of the prior art induction logging tool. The new induction logging tool includes a new induction array which appears to be "folded" about an axis which coincides with the transmitter of the prior art induction array of the prior art induction logging tool, the "new folded induction array" including: (1) a transmitter coil, (2) a plurality of "cowound" receiver coils and bucking coils, (3) a further plurality of individual receiver coils, and (4) at least one further bucking coil. The transmitter coil is located at an end of the new folded induction array; however, the plurality of cowound receiver coils and bucking coils, the individual receiver coils, and the one further bucking coil are all located adjacent to and only on one side of the transmitter coil of the new folded induction array.

In the new folded induction array, each of the plurality of cowound receiver coils and bucking coils include a receiver coil (N−1) and a bucking coil (N), which is really associated with another receiver coil (N), the receiver coil (N−1) and the bucking coil (N) being cowound together on the same ceramic bobbin and therefore being positioned at approximately the same distance from the transmitter coil.

For each of the cowound receiver coils and bucking coils, the receiver coil (N−1) and the bucking coil (N), which is really associated with another receiver coil (N), are both positioned at approximately the same distance from the transmitter coil because each of the cowound receiver coils and bucking coils are formed by winding both its bucking coil (N) and its receiver coil (N−1) in a bifilar way on the same ceramic bobbin starting from the center of the bobbin and winding the receiver coil (N−1) and the bucking coil (N) in opposite outward directions.

However, although it is important that each cowound receiver coil and bucking coil must be formed by winding the bucking coil (N) and the receiver coil (N−1) on the same ceramic bobbin, recalling that each bucking coil (N) is really associated with its own corresponding receiver coil (N), it is also important that the number of coil-turns for each bucking coil (N) and its corresponding receiver coil (N) must be carefully selected. That is, for each cowound receiver coil and bucking coil, two criteria must exist and be satisfied at the same time:

(1) the turns ratio between the turns of the receiver coil (N) and its corresponding bucking coil (N) must be carefully selected in order to balance or null the direct mutual coupling between the transmitter and receiver array, and (2) even though the aforementioned turns ratio must be carefully selected, the receiver coil (N−1) and the bucking coil (N) associated with another receiver coil (N) must nevertheless be cowound together on the same ceramic bobbin.

As a result, since the receiver coil (N−1) and the bucking coil (N) are cowound together on the same ceramic bobbin, the bucking coil (N) and the receiver coil (N−1) are both located at approximately the same distance from the transmitter coil. Consequently, the length of the new folded induction array of the new induction tool of the present invention is approximately half the length of the induction array of the prior art induction tool.

Further scope of applicability of the present invention will become apparent from the detailed description presented hereinafter. It should be understood, however, that the detailed description and the specific examples, while representing a preferred embodiment of the present invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIGS. 7 through 12 illustrate further, more detailed, construction views of each of the plurality of cowound receiver coils and bucking coils of FIG. 6.

DETAILED DESCRIPTION OF THE PREFERRED EMBODIMENT

Figure 1:
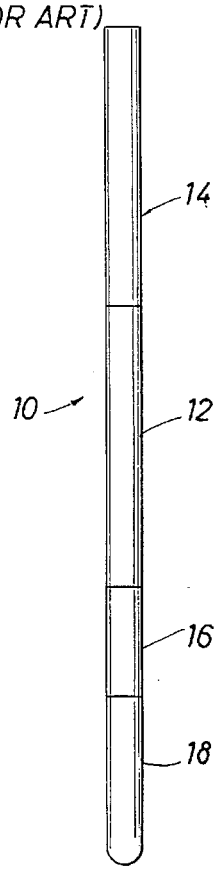
FIG. 1 illustrates the prior art induction logging tool disclosed in the Chandler patent which further includes an array section.

Refering to FIG. 1, a prior art induction logging tool 10 includes a sensor array 12, an electronics section 14, a transmitter electronics section 16, and a spontaneous potential (SP) sub 18.

While the measurements made by the prior art induction logging tool 10 of FIG. 1 are accurate and plentiful, the length of the tool 10, including the sensor array, is approximately forty (40) feet. As a result of this 40 foot length, it may be difficult to place the prior art induction logging tool 10 of FIG. 1 in wellbores having a minimum rathole, or in wellbores having severe dog legs, or in horizontal wellbores having a short kickoff radius.

The sensor array 12 of the prior art induction logging tool of FIG. 1 is discussed in U.S. Pat. No. 5,157,605 to Chandler et at, the disclosure of which has already been incorporated by reference into this specification. Other patents also discuss various other features of the prior art induction logging tool 10 of FIG. 1, and these other patents include: (1) U.S. Pat. No. 5,041,975 to Minerbo et al directed to borehole correction, (2) U.S. Pat. No. 5,355,088 to Howard Jr directed to a method and apparatus for determining invasion parameters, (3) U.S. Pat. No. 5,184,079 to Barber directed to a method and apparatus for eliminating the effects of a dip angle on collected data, and (4) U.S. Pat. No. 5,379,216 to Head directed to a volume transform system. The Minerbo et al patent, the Howard Jr patent, the Barber patent, and the Head patent are each incorporated by reference into this specification.

Figure 2:
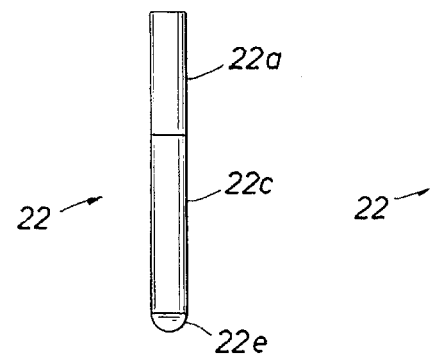
FIG. 2 illustrates the induction logging tool of the present invention which is shorter in length than the prior art induction logging tool of FIG. 1.

Referring to FIG. 2, an induction logging tool 22 in accordance with the present invention is illustrated. This induction logging tool 22 includes a sensor array 22c, an electronics section 22a, and a spontaneous potential (SP) electrode 22e. However, the length of the logging tool 22 of the present invention in FIG. 2 is approximately 16 feet. Compare the length of the induction logging tool 22 of the present invention shown in FIG. 2 (16 feet) with the length of the prior art induction logging tool 10 shown in FIG. 1 (40 feet). This reduction in the length of the induction logging tool 22, from 40 feet to 16 feet, will allow the induction logging tool 22 of FIG. 2 to be placed in wellbores having a minimum rathole, or in wellbores having severe dog legs, or in horizontal wellbores having a short kickoff radius.

Figure 3:
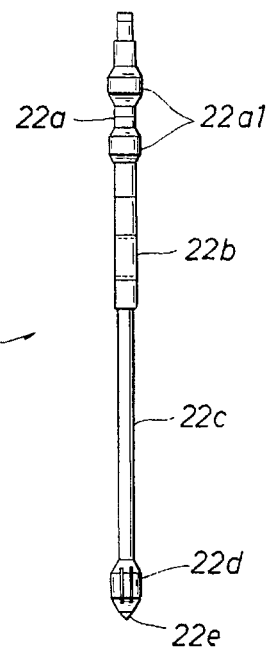
FIG. 3 illustrates in greater detail the induction logging tool of the present invention shown in FIG. 2 which further includes an array section called the new "folded array" in accordance with the present invention.

Referring to FIG. 3, the induction logging tool 22 of the present invention shown in FIG. 2 is illustrated again in greater detail in FIG. 3.

In FIG. 3, the induction logging tool 22 of the present invention shown in FIG. 3 includes an electronics section 22a including upper standoffs 22a1, a compensator section 22b, a sensor array 22c (also illustrated as the sensor array 22c in FIG. 2), a lower standoff 22d, and a nose section 22e. The nose section 22e is disclosed in U.S. Pat. No. 5,574,371 issued Nov. 12, 1996, and entitled "Method and Apparatus for measuring mud resistivity in a wellbore including a probe having a bottom electrode located at the bottom of a tool string and propagating a current from and to the bottom electrode in a direction parallel to a longitudinal axis of the tool string", the disclosure of which is incorporated by reference into this specification.

Figure 4:
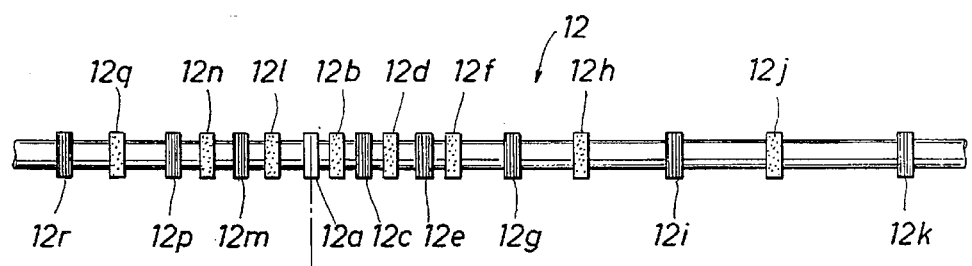
FIG. 4 illustrates a detailed construction of the array section of the prior art induction logging tool of FIG. 1.

Referring to FIG. 4, the sensor array 12 of the prior art induction logging tool 10 of FIG. 1 is illustrated. This sensor array 12 is adequately described in the U.S. Pat. No. 5,157,605 to Chandler already incorporated herein by reference.

The sensor array 12 of FIG. 4 includes a transmitter coil 12a disposed in the center, a plurality of bucking coils and receiver coils disposed on one side of the transmitter coil 12a, and a further plurality of bucking coils and receiver coils disposed on the other side of the transmitter coil 12a.

For example, the following bucking coils and receiver coils exist on a first side of the transmitter coil 12a: the 6 inch bucking coil 12b, the 6 inch receiver coil 12c, the 12 inch bucking coil 12d, the 12 inch receiver coil 12e, the 21 inch bucking coil 12f, the 21 inch receiver coil 12g, the 39 inch bucking coil 12h, the 39 inch receiver coil 12i, the 72 inch bucking coil 12j, and the 72 inch receiver coil 12k. The above reference to inches, for example in "6 inch receiver coil" and "6 inch bucking coil", refers to the distance between the transmitter coil and the receiver coil. In the above example, the "6 inch" would refer to the 6 inch distance between the transmitter coil and the "6 inch receiver coil". However, since each particular receiver coil has its own corresponding particular bucking coil (for cancelling out the mutual inductance between the transmitter coil and the particular receiver coil), the "6 inch" identification for the receiver coil is also retained for its corresponding bucking coil thereby identifying the corresponding bucking coil as a "6 inch bucking coil". As a result, each receiver coil and its own particular bucking coil can be uniquely identified.

In addition, the following bucking coils and receiver coils exist on a second side (opposite to the first side) of the transmitter coil 12a: the 9 inch bucking coil 12l, the 9 inch receiver coil 12m, the 15 inch bucking coil 12n, the 15 inch receiver coil 12p, the 27 inch bucking coil 12q, and the 27 inch receiver coil 12r.

In FIG. 4, note the dotted line 24 passing through the transmitter coil 12a. This dotted line represents a "fold line". Assume that it were possible to fold (or rotate) the second side of the sensor array 12 of FIG. 4 about the dotted line 24, and overlay the second side of sensor array 12 (which includes the 9 inch bucking coil 12l) over the first side of the sensor array 12 (which includes the 6 inch bucking coil 12b). If this "folding operation" were possible, the result of the "folding operation" would be the sensor array 22c (hereinafter called "the folded array 22c") shown in FIG. 5 in accordance with the present invention.

Figure 5:
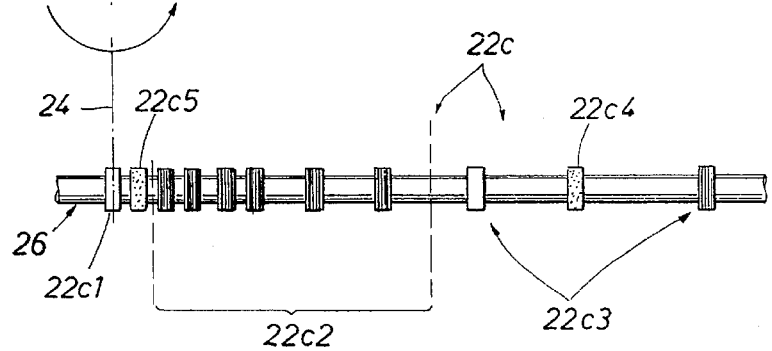
FIG. 5 illustrates a detailed construction of the new "folded array" section of the induction logging tool of FIG. 3 of the present invention.

Referring to FIG. 5, the folded array 22c of the induction logging tool 22 of FIGS. 2 and 3 of the present invention is illustrated.

In FIG. 5, the folded array 22c includes a transmitter coil 22c1 disposed on one side of the array, and (1) a 6 inch bucking coil 22c5, (2) a plurality of cowound receiver coils and bucking coils 22c2, (3) a further plurality of individual receiver coils 22c3, and (4) at least one further bucking coil 22c4, all of which are disposed only on one side of the transmitter coil 22c1. The transmitter coil 22c1 is located at an end 26 of the new folded array 22c, and the plurality of cowound receiver coils and bucking coils 22c2, the 6 inch bucking coil 22c5, the individual receiver coils 22c3, and the one further bucking coil 22c4 are located adjacent to and on only one side of the transmitter coil 22c1 of the new folded array 22c.

Recall that each particular receiver coil has its own corresponding particular bucking coil. Since a mutual inductance exists between the transmitter coil and the particular receiver coil, the particular bucking coil is needed, for that particular receiver coil, in order to cancel out the mutual inductance between the transmitter coil and the particular receiver coil. The particular bucking coil cancels out the mutual inductance by carefully selecting its winding rotational direction and the number of its coil turns. Therefore, in accordance with one aspect of the present invention, each of the plurality of cowound receiver coils and bucking coils 22c2 in FIG. 5 include a receiver coil (N−1) and a bucking coil (N) which is really associated with another receiver coil (N). Furthermore, each of the plurality of cowound receiver coils and bucking coils 22c2 in FIG. 5 are formed by winding both the receiver coil (N−1) and its bucking coil (N) in a bifilar way on the same ceramic bobbin starting from the center of the bobbin and winding the receiver coil (N−1) and the bucking coil (N) in opposite outward directions.

In addition, although it is important that each cowound receiver coil and bucking coil 22c2 be formed by winding the receiver coil (N−1) and the bucking coil (N) on the same ceramic bobbin, recalling that each bucking coil (N) is associated with its own corresponding receiver coil (N), it is also important that the number of coil-turns for each bucking coil (N) and each receiver coil (N) be carefully selected. That is, for each cowound receiver coil and bucking coil 22c2, two criteria must exist and be satisfied at the same time:

(1) The turns ratio between the turns of a particular receiver coil (N) and its corresponding bucking coil (N) must be carefully selected in order to balance or null the direct mutual coupling between the transmitter and receiver array, and (2) When the aforementioned turns ratio is carefully selected, the receiver coil (N−1) and the bucking coil (N), associated with another receiver coil (N), must nevertheless be cowound on the same ceramic bobbin. When the receiver coil (N−1) and the bucking coil (N) are cowound on the same ceramic bobbin, the bucking coil (N) and the receiver coil (N−1) are both located at approximately the same distance from the transmitter coil.

As a result, the functional operation of the new folded array 22c of the present invention of FIG. 5 is the same as the functional operation of the prior art sensor array 12 of FIG. 4, the functional operation being discussed in U.S. Pat. No. 5,157,605 to Chandler et at; however, the new folded array 22c of the present invention of FIG. 5 (part of the induction logging tool 22 of FIGS. 2 and 3) is shorter in length than the prior art sensor array 12 of FIGS. 1 and 4 thereby allowing the new induction logging tool 22 of FIGS. 2 and 3 to be placed in wellbores having a minimum rathole, or in wellbores having severe dog legs, or in horizontal wellbores having a short kickoff radius.

Figure 6:
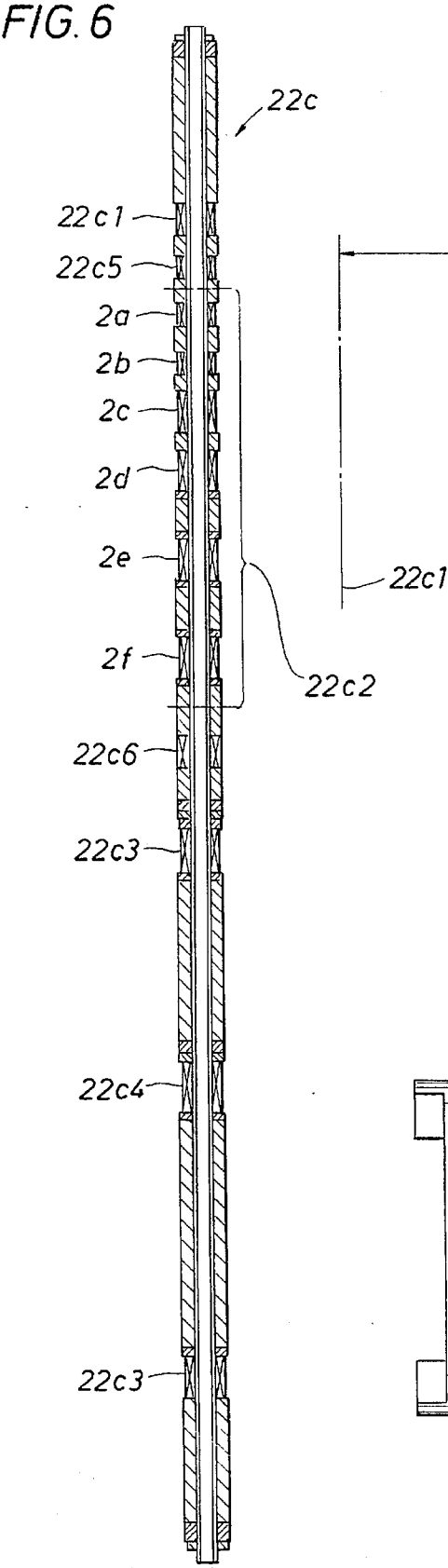
FIG. 6 illustrates a further more detailed construction of the new folded array section of the induction logging tool of the present invention illustrated in FIG. 5, the new folded army section including a "plurality of cowound receiver coils and bucking coils"

Referring to FIG. 6, a further more detailed construction of the new folded array 22c of FIGS. 2, 3, and 5 of the new induction logging tool 22 of FIGS. 2 and 3 is illustrated.

If it were possible to fold (or rotate) the second side of the induction section 12 of FIG. 4 about the dotted line 24 and overlay the second side of induction section 12 of FIG. 4 (which includes the 9 inch bucking coil 12l) over the first side of the induction section 12 of FIG. 4 (which includes the 6 inch bucking coil 12b), previously called "a folding operation", a plurality of the receiver coils and bucking coils disposed on one side of the array 12 of FIG. 4 would overlay a corresponding plurality of the receiver coils and bucking coils disposed on the other side of the array 12 of FIG. 4, and the new folded array section 22c of FIGS. 5 and 6 would be the result.

The induction logging tool of the prior art shown in FIG. 4 includes a plurality of receiver coils and bucking coils. Each of the receiver coils and bucking coils are defined as follows:

1. A 6 inch receiver coil and corresponding 6 inch bucking coil
2. A 9 inch receiver coil and corresponding 9 inch bucking coil
3. A 12 inch receiver coil and corresponding 12 inch bucking coil
4. A 15 inch receiver coil and corresponding 15 inch bucking coil
5. A 21 inch receiver coil and corresponding 21 inch bucking coil
6. A 27 inch receiver coil and corresponding 27 inch bucking coil
7. A 39 inch receiver coil and corresponding 39 inch bucking coil
8. A 57 inch receiver coil and corresponding 57 inch bucking coil
9. A 72 inch receiver coil and corresponding 72 inch bucking coil Referring to the above list of receiver coils and bucking coils, it is necessary to define certain nomenclature used in this specification:

(1) If the bucking coil (N) consists of the 9 inch bucking coil, the receiver coil (N) consists of the 9 inch receiver coil, but the receiver coil (N−1) consists of the 6 inch receiver coil, the previously mentioned coil in the above list.

(2) Similarly, if the bucking coil (N) consists of the 39 inch bucking coil, the receiver coil (N) consists of the 39 inch receiver coil, but the receiver coil (N−1) consists of the 27 inch receiver coil, the previously mentioned coil in the above list.

In FIG. 6, the new folded array 22c includes the transmitter coil 22c1, the 6 inch bucking coil 22c5, the "plurality of cowound receiver coils and bucking coils" 22c2, a temperature sensor 22c6, the individual receiver coils 22c3, and the one further bucking coil 22c4, all of which are disposed on one side only of the transmitter coil 22c1. The advantage of the new folded array 22c relative to the prior art sensor array 12 is as follows: the new folded array 22c of FIGS. 5 and 6 is shorter in length than the sensor array 12 of FIG. 4. This shortened length of the folded array 22c allows the new induction logging tool 22 of FIGS. 2 and 3 to be placed in wellbores which have a minimum rathole, or in wellbores having severe dog legs, or in horizontal wellbores having a short kickoff radius.

In FIGS. 5 and 6, the plurality of cowound receiver coils and bucking coils 22c2 of the new folded array 22c include the following:

(1) a 6 inch receiver/9 inch bucking coil 2a—in FIGS. 5 and 6, the 6 inch receiver coil from the prior art sensor array 12 of FIG. 4 is wound on the same bobbin as the 9 inch bucking coil from the sensor array 12 of FIG. 4, (2) a 9 inch receiver/12 inch bucking coil 2b—in FIGS. 5 and 6, the 9 inch receiver coil from the prior art sensor array 12 of FIG. 4 is wound on the same bobbin as the 12 inch bucking coil from the sensor array 12 of FIG. 4, (3) a 12 inch receiver/15 inch bucking coil 2c—in FIGS. 5 and 6, the 12 inch receiver coil from the prior art sensor array 12 of FIG. 4 is wound on the same bobbin as the 15 inch bucking coil from the sensor array 12 of FIG. 4, (4) a 15 inch receiver/21 inch bucking coil 2d—in FIGS. 5 and 6, the 15 inch receiver coil from the prior art sensor array 12 of FIG. 4 is wound on the same bobbin as the 21 inch bucking coil from the sensor array 12 of FIG. 4, (5) a 21 inch receiver/27 inch bucking coil 2e—in FIGS. 5 and 6, the 21 inch receiver coil from the prior art sensor array 12 of FIG. 4 is wound on the same bobbin as the 27 inch bucking coil from the sensor array 12 of FIG. 4, and (6) a 27 inch receiver/39 inch bucking coil 2f—in FIGS. 5 and 6, the 27 inch receiver coil from the prior art sensor array 12 of FIG. 4 is wound on the same bobbin as the 39 inch bucking coil from the sensor array 12 of FIG. 4.

From the aforementioned description of the plurality of cowound receiver coils and bucking coils 22c2, it is evident that each of the plurality of cowound receiver coils and bucking coils 22c2 in FIGS. 5 and 6 include a receiver coil (N−1) and a bucking coil (N). However, the bucking coil (N) is associated with another receiver coil (N); it is not associated with the receiver coil (N−1). In addition, the plurality of cowound receiver coils and bucking coils 22c2 are all located on one side of the transmitter 22c1, the transmitter 22c1 itself being located at the end 26 of the array. The bucking coil (N) and the receiver coil (N−1) of each cowound receiver coil and bucking coil 22c2 is wound on the same ceramic bobbin. As a result, the bucking coil (N) and the receiver coil (N−1) are positioned at approximately the same distance from the transmitter coil 22c1. Furthermore, the turns ratio for a particular receiver coil and bucking coil [that is, the number of turns of a particular receiver coil (N) divided by the number of turns of its corresponding bucking coil (N)] must be carefully selected in order to balance or null the direct mutual coupling between the transmitter and receiver array.

Referring to FIGS. 7 through 12, a detailed construction of each of the plurality of cowound receiver coils and bucking coils 22c2 is illustrated, these illustrations depicting the manner by which each cowound receiver coil and bucking coil 22c2 are cowound together about the same bobbin and about the same bobbin pin.

Figure 7:
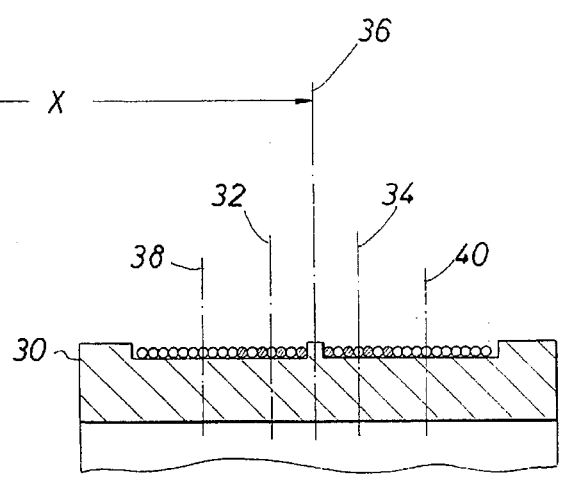

In FIG. 7, the bucking coil 32, 34 and the receiver coil 38, 40 associated with one of the plurality of cowound receiver coils and bucking coils 22c2 are cowound about a nominal center 36 of a bobbin 30. As a result, the bucking coil 32, 34 and the receiver coil 38, 40 are located at approximately the same distance "x" from the transmitter coil 22c1.

Recall that each of the plurality of cowound receiver coils and bucking coils 22c2 are cowound together about the same ceramic bobbin. Each of the plurality of cowound receiver coils and bucking coils consist of (1) a bucking coil, and (2) a receiver coil. For example, the 6 inch receiver/9 inch bucking coil 2a consists of the 6 inch receiver coil (the receiver coil) and the 9 inch bucking coil (the bucking coil). In FIG. 7, the bucking coil of a particular cowound receiver coil and bucking coil (one of 2a–2f of 22c2) consists of a first bucking coil 32 (hereinafter called "Buck C1 32") and a second bucking coil 34 (hereinafter called "Buck C2 34"); and the receiver coil of the same particular cowound receiver coil and bucking coil (one of 2a–2f of 22c2) consists of a first receiver coil 38 (hereinafter called "Rec C1 38"), which is interleaved in part with the first bucking coil 32, and a second receiver coil 40 (hereinafter called "Rec C2 40"), which is interleaved in part with the second bucking coil 34. Note from the above description that the first receiver coil 38 is "interleaved in part" with the first bucking coil 32 and that the second receiver coil 40 is "interleaved in part" with the second bucking coil 34. The above reference to "interleaving" will be discussed in greater detail below with reference to FIG. 10 of the drawings.

Therefore, in our example, the cowound receiver coil and bucking coil "the 6 inch receiver/9 inch bucking coil 2a" includes the 6 inch receiver coil and the 9 inch bucking coil, the 6 inch receiver coil being represented by the first receiver coil 38 of FIG. 7 plus the second receiver coil 40 of FIG. 7 (Rec C1 38+Rec C2 40), the 9 inch bucking coil being represented by the first bucking coil 32 of FIG. 7 plus to the second bucking coil 34 of FIG. 7 (Buck C1 32+Buck C2 34).

Similarly, the cowound receiver coil and bucking coil "the 27 inch receiver/39 inch bucking coil 2f" includes the 27 inch receiver coil and the 39 inch bucking coil, the 27 inch receiver coil being represented by the first receiver coil 38 of FIG. 7 plus the second receiver coil 40 of FIG. 7 (Rec C1 38+Rec C2 40), the 39 inch inch bucking coil being represented by the first bucking coil 32 of FIG. 7 plus the second bucking coil 34 of FIG. 7 (Buck C1 32+Buck C2 34).

Therefore, each cowound receiver coil and bucking coil (2a–2f) 22c2 of FIG. 6 consists of a particular receiver coil (N−1) and a particular bucking coil (N), the particular receiver coil (N−1) consisting of (Rec C1 38+Rec C2 40) of FIG. 7, the particular bucking coil (N) consisting of (Buck C1 32+Buck C2 34) of FIG. 7. In addition, in FIG. 7, the particular receiver coil (N−1) and the particular bucking coil (N) are both positioned about the nominal center 36, the nominal center 36 being further positioned at a distance "x" from the transmitter coil 22c1. Therefore, the particular receiver coil (N−1) and the particular bucking coil (N) are both located at approximately the same distance "x" from the transmitter coil 22c1. As a result, the receiver coil (N−1) and the bucking coil (N) of each of the plurality of cowound receiver coils and bucking coils (2a–2f of 22c2) are each positioned at approximately the same distance "x" from the transmitter coil 22c1. This concept will be better understood by reading the following detailed description.

FIG. 7 illustrates the first half of the bucking coil 32 (Buck C1 32) interleaved with the first half of the receiver coil 38 (Rec C1 38), and the second half of the bucking coil 34 (Buck C2 34) interleaved with the second half of the receiver coil 40 (Rec C2 40), each being wound about the nominal center 36 of the bobbin 30. However, FIG. 7 does not illustrate exactly how such coils 32, 34, 38, 40 are cowound together about the bobbin 30. The following discussion with reference to FIGS. 8 through 12 will provide a description of exactly how such coils 32, 34, 38, and 40 are cowound together about the same ceramic bobbin 30.

Figure 8:
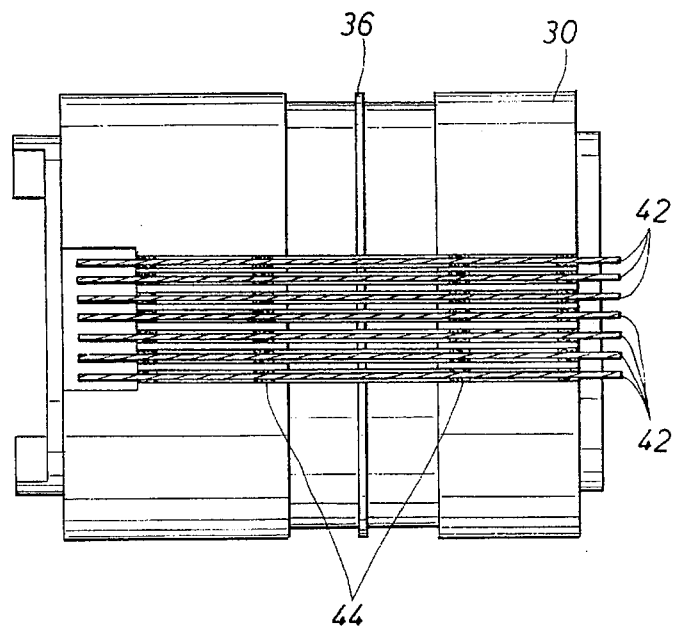

In FIG. 8, recalling (from FIG. 7) that Buck C1 32 interleaved with Rec C1 38 is disposed on one side of the nominal center 36 and is wound about the bobbin 30, and Buck C2 34 interleaved with Rec C2 40 is disposed on the other side of nominal center 36 and is wound about the bobbin 30, FIG. 8 illustrates the nominal center 36 on the bobbin 30. However, in FIG. 8, a plurality of bobbin pins 42 are transversely disposed relative to the nominal center 36, the plurality of bobbin pins 42 being held together by an epoxy 44. The receiver coil and bucking coil 32, 34, 38, 40 of FIG. 7 associated with each of the plurality of cowound receiver coils and bucking coils 2a through 2f of FIG. 6 are initially connected to one of the bobbin pins 42 of bobbin 30 before the coils are cowound about the same bobbin 30. FIG. 9 better illustrates how each cowound receiver coil and bucking coil (32, 34, 38, 40) of FIG. 7 of the plurality of cowound receiver coils and bucking coils (2a–2f) 22c2 of FIG. 6 are connected to bobbin pins 42 and cowound about the same bobbin 30.

In FIG. 9, the "Buck C1 32" portion of the bucking coil of FIG. 7 interleaved with the "Rec C1 38" portion of the receiver coil of FIG. 7 (associated with one of the cowound receiver coils and bucking coils 22c2) is shown connected to a bobbin pin 42 of bobbin 30. In FIG. 9, note how the Buck C1 32 bucking coil is interleaved with the Rec C1 38 receiver coil on the one side of the nominal center 36 of the bobbin 30. In FIG. 9, the Buck C1 32 bucking coil includes an end which is shown to be stripped of its outer insulating layer thereby exposing a wire pin 48. The wire pin 48 has an end portion 50 which is physically wrapped around a bobbin pin 42, one of the bobbin pins 42 shown in FIG. 8. Further reference to FIG. 10 will better illustrate the co-winding of each of the receiver coils and bucking coils 32, 38 and 34, 40 about the bobbin 30 when the end portion 50 of each wire pin 48 of either the bucking coil 32, 34 or the receiver coil 38, 40 is wrapped around the bobbin pin 42 in the manner illustrated in FIG. 9.

In FIG. 10, the first half of the bucking coil 32 (Buck C1 32) is shown interleaved with the first half of the receiver coil 38 (Rec C1 38) on the left side of nominal center 36 and is wound around the bobbin 30 in the winding direction indicated by arrow 52 (upwardly in FIG. 10). However, note that the bucking coil turns 32 are initially interleaved with the receiver coil turns 38; however, when the bucking coil turns 32 wrap around bobbin 30, in the direction indicated by arrow 52, to the point in FIG. 10 indicated by numeral 56, the bucking coil turns 32 begin to cut across several successive receiver coil turns 38. This happens because the bucking coil 32 ends, at 56, but the receiver coil 38 continues to wrap around the bobbin 30. As a result, the bucking coil 32 cuts across several successive receiver coil turns 38.

However, the second half of the bucking coil 34 (Buck C2 34) is shown interleaved with the second half of the receiver coil 40 (Rec C2 40) on the fight side of nominal center 36 and is wound around the bobbin 30 in the winding direction indicated by the arrow 54 (downwardly in FIG. 10). However, note that the bucking coil turns 34 are initially interleaved with the receiver coil turns 40; however, when the bucking coil turns 34 wrap around bobbin 30, in the direction indicated by arrow 54, to the point in FIG. 10 indicated by numeral 58, the bucking coil turns 34 begin to cut across several successive receiver coil turns 40. This happens because the bucking coil 34 ends, at 58, but the receiver coil 40 continues to wrap around the bobbin 30. As a result, the bucking coil 34 cuts across several successive receiver coil turns 40.

The end portions 50 of each bucking coil (N) 32, 34 and each receiver coil (N–1) 38, 40 of FIG. 7 of each of the plurality of cowound bucking coils and receiver coils 2a–2f of 22c2 of FIG. 6 are wrapped around the following bobbin pins 42:

(1) the end portion 50 of the first half of the bucking coil 32 (Buck C1 32) of FIG. 7 is initially wrapped around the bobbin pin No. 2 of FIG. 10 and the bucking coil 32 is wrapped around the bobbin 30 in the direction of arrow 52 (upwardly in FIG. 10);

(2) the end portion 50 of the first half of the receiver coil 38 (Rec C1 38) of FIG. 7 is initially wrapped around bobbin pin number 4 of FIG. 10 and the receiver coil 38 is wrapped around bobbin 30 in the direction of arrow 52 (upwardly in FIG. 10);

(3) the end portion 50 of the second half of the bucking coil 34 (Buck C2 34) of FIG. 7 is initially wrapped around bobbin pin no. 2 of FIG. 10 and the bucking coil 34 is wrapped around bobbin 30 in the direction of arrow 54 (downwardly in FIG. 10), and (4) the end portion 50 of the second half of the receiver coil 40 (Rec C2 40) of FIG. 7 is initially wrapped around bobbin pin number 7 of FIG. 10 and the receiver coil 40 is wrapped around bobbin 30 in the direction of arrow 54 (downwardly in FIG. 10).

Figure 11:
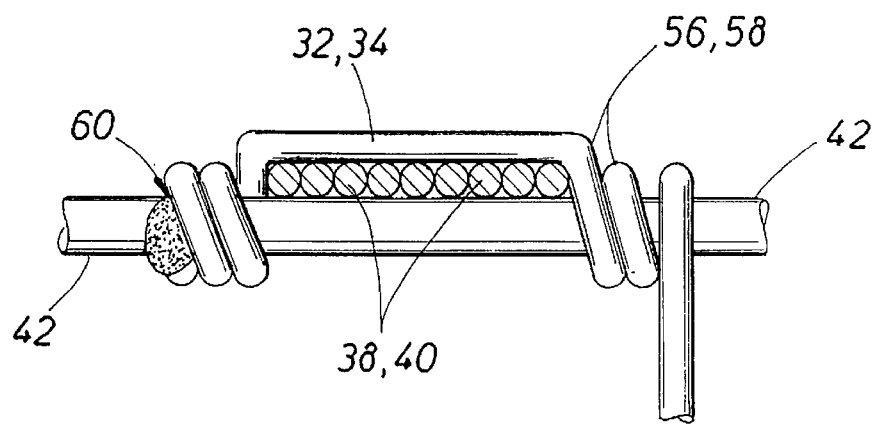

In FIG. 11, the bucking coil portion 32 and 34 of FIG. 10, which cuts across several successive receiver coils 38 and 40 of FIG. 10, is illustrated in greater detail. Since the bucking coil portion 32 and 34 ends abruptly, at 56 and 58, but the receiver coils 38, 40 continue to wrap around the bobbin 30, the bucking coil portion 32 and 34 must cut across the successively wrapped receiver coils 38 and 40, the end of the bucking coil portion 32, 34 being soldered to a bobbin pin 42, at 60.

Figure 12:
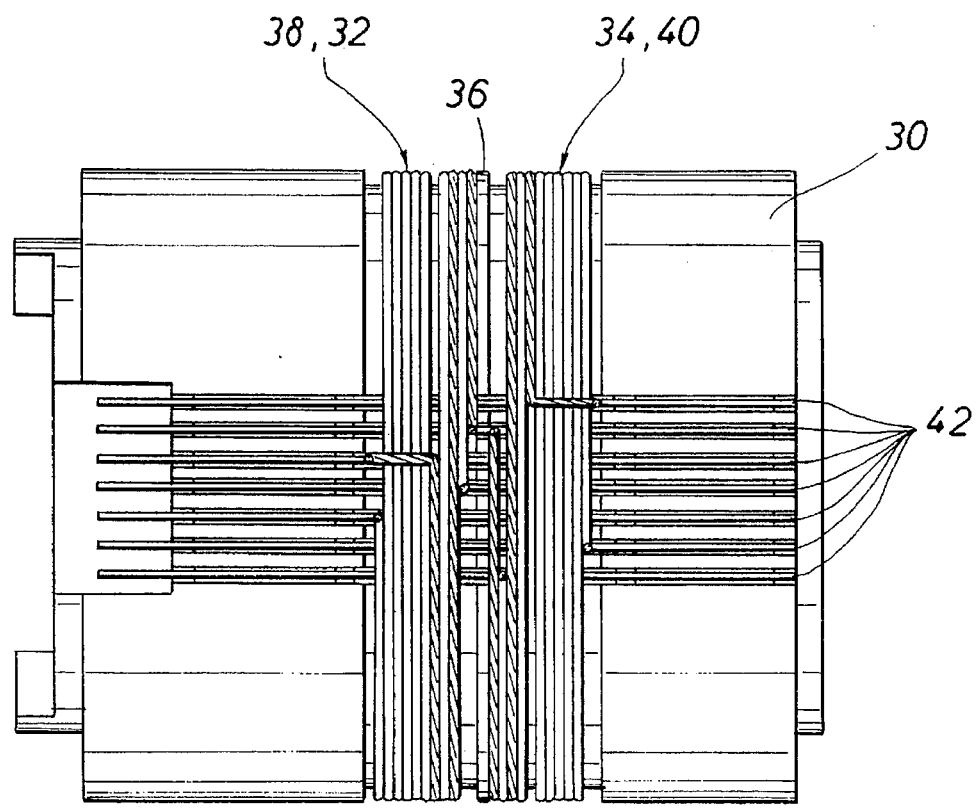

In FIG. 12, recall that each of the plurality of cowound bucking coils and receiver coils 2a–2f22c2 of FIG. 6 includes a bucking coil (N) and a receiver coil (N–1), where the bucking coil (N) further includes a first bucking coil 32 (Buck C1 32) and a second bucking coil 34 (Buck C2 34), and the receiver coil (N–1) further includes a first receiver coil 38 (Rec C1 38) and a second receiver coil 40 (Rec C1 40). However, the first bucking coil 32 is interleaved in part with the first receiver coil 38 when the coils 32, 38 are wrapped around a bobbin 30 in one direction (arrow 52), and the second bucking coil 34 is interleaved in part with the second receiver coil 40 when the coils 34, 40 are wrapped around the same bobbin 30 in a direction opposite to the one direction (arrow 54). Therefore, when the first bucking coil 32 ("Buck C1 32") and the first receiver coil 38 ("Rec C1 38") are wound in an interleaved fashion on one side of the nominal center 36 in the manner shown in FIGS. 7 and 10, and when the second bucking coil 34 ("Buck C2 34") and the second receiver coil 40 ("Rec C2 40") are wound in an interleaved fashion on the other side of the nominal center 36 in the manner shown in FIGS. 7 and 10, the result is shown in FIG. 12.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A logging tool adapted to be disposed in a borehole, comprising:

an array section, said array section including, a transmitter coil, and a plurality of cowound receiver coils and bucking coils disposed adjacent one end of said transmitter coil, each of said plurality of cowound receiver coils and bucking coils including, a bobbin, and a receiver coil (N–1) and a bucking coil (N) cowound together on said bobbin, said bucking coil (N) being associated with another receiver coil (N) and not with said receiver coil (N–1), said bucking coil (N) being designed to balance a mutual coupling between the transmitter coil and said another receiver coil (N) and not between the transmitter coil and said receiver coil (N–1), wherein said transmitter coil is not cowound.

2. The logging tool of claim 1, wherein said array section further comprises:

a bucking coil disposed adjacent said one end of said transmitter coil;

an individual receiver coil disposed adjacent said one end of said transmitter coil; and one further bucking coil disposed adjacent said one end of said transmitter coil.

3. The logging tool of claim 1, wherein said mutual coupling exists between said transmitter coil and the receivers of said plurality of cowound bucking coils and receiver coils, said bucking coil (N) of each of said plurality of cowound bucking coils and receiver coils including a number of turns, said receiver coil (N) further including a number of turns, the ratio between the number of turns of said receiver coil (N) and the number of turns of said bucking coil (N) being carefully selected such that said direct mutual coupling between said transmitter coil and the receivers of said plurality of cowound bucking coils and receiver coils is balanced.

4. The logging tool of claim 3, wherein said bucking coil (N) and said receiver coil (N–1) of each said plurality of cowound receiver coils and bucking coils are located at approximately the same distance "x" from the transmitter coil.

5. The logging tool of claim 4, wherein said array section further comprises:

a bucking coil disposed adjacent said one end of said transmitter coil;

an individual receiver coil disposed adjacent said one end of said transmitter coil; and one further bucking coil disposed adjacent said one end of said transmitter coil.

6. A logging sonde adapted to be disposed in a wellbore, comprising:

an array section having an end, said array section including, a transmitter coil located at said end of said array section, and a plurality of cowound bucking coils and receiver coils located adjacent to one end of said transmitter coil within said array section, each of said plurality of cowound bucking coils and receiver coils including, a bobbin, and a receiver coil (N–1) and a bucking coil (N) cowound together about said bobbin, said bucking coil (N) being associated with another receiver coil (N), said bucking coil (N) being designed to balance a mutual coupling between the transmitter coil and said another receiver coil (N) and not between the transmitter coil and said receiver coil (N–1); and wherein said transmitter coil is not cowound.

7. The logging sonde of claim 6, wherein said mutual coupling exists between said transmitter coil and the receivers of said plurality of receiver coils and bucking coils, said bucking coil (N) of each of said plurality of cowound bucking coils and receiver coils including a number of turns, said receiver coil (N) further including a number of turns, the ratio between the number of turns of said receiver coil (N) and the number of turns of said bucking coil (N) being carefully selected such that said mutual coupling between said transmitter coil and the receivers of said plurality of receiver coils and bucking coils is nulled.

8. The logging sonde of claim 6, wherein said receiver coil (N–1) is wound in a first direction about said bobbin, and said bucking coil (N) is wound in a second direction about said bobbin, said second direction being opposite to said first direction.

9. The logging sonde of claim 8, wherein said bucking coil (N) includes a first number of turns about said bobbin, said receiver coil (N–1) including a second number of turns about said bobbin, said first number of turns of said bucking coil (N) being less than the second number of turns of said receiver coil (N–1).

10. The logging sonde of claim 9, wherein a mutual coupling exists between said transmitter coil and the receivers of said plurality of receiver coils and bucking coils, said bucking coil (N) of each of said plurality of cowound bucking coils and receiver coils including a number of turns, said receiver coil (N) further including a number of turns, the ratio between the number of turns of said receiver coil (N) and the number of turns of said bucking coil (N) being carefully selected such that said mutual coupling between said transmitter coil and the receivers of said plurality of receiver coils and bucking coils is nulled.

11. A logging tool adapted to be disposed in a wellbore, comprising:

a sensor array having an end; said sensor array including, a transmitter coil having an end and located adjacent to said end of said sensor array and adapted for inducing a current in a formation penetrated by the wellbore, and a cowound receiver coil and bucking coil located adjacent to said end of said transmitter coil, said cowound receiver coil and bucking coil including, a bobbin;

a bucking coil (N) wound about said bobbin in one direction; and a receiver coil (N–1) wound about said bobbin in a direction opposite to said one direction, the receiver coil (N–1) adapted to conduct signals in response to said current in said formation, wherein said transmitter coil is not cowound.

12. The logging tool of claim 11, wherein said sensor array further comprises another receiver coil (N), and wherein said bucking coil (N) of said cowound receiver coil and bucking coil corresponds to said another receiver coil (N) and does not correspond to said receiver coil (N–1), said bucking coil (N) being designed to balance a mutual coupling between the transmitter coil and said another receiver coil (N) and not between the transmitter coil and said receiver coil (N–1).

13. The logging tool of claim 12, wherein said mutual coupling exists between said transmitter coil and said cowound receiver coil and bucking coil, said bucking coil (N) of said cowound receiver coil and bucking coil including a number of turns, said another receiver coil (N) including a number of turns, the ratio between the number of turns of said another receiver coil (N) and the number of turns of said bucking coil (N) being carefully selected such that said mutual coupling between said transmitter coil and said cowound receiver coil and bucking coil is approximately equal to zero.

14. The logging tool of claim 13, wherein said logging tool is an induction logging sonde.

* * * * *